F. P. McCOLL.
CAN SOLDERING MACHINE.
APPLICATION FILED SEPT. 27, 1909.
1,052,736.
Patented Feb. 11, 1913.
3 SHEETS—SHEET 1.
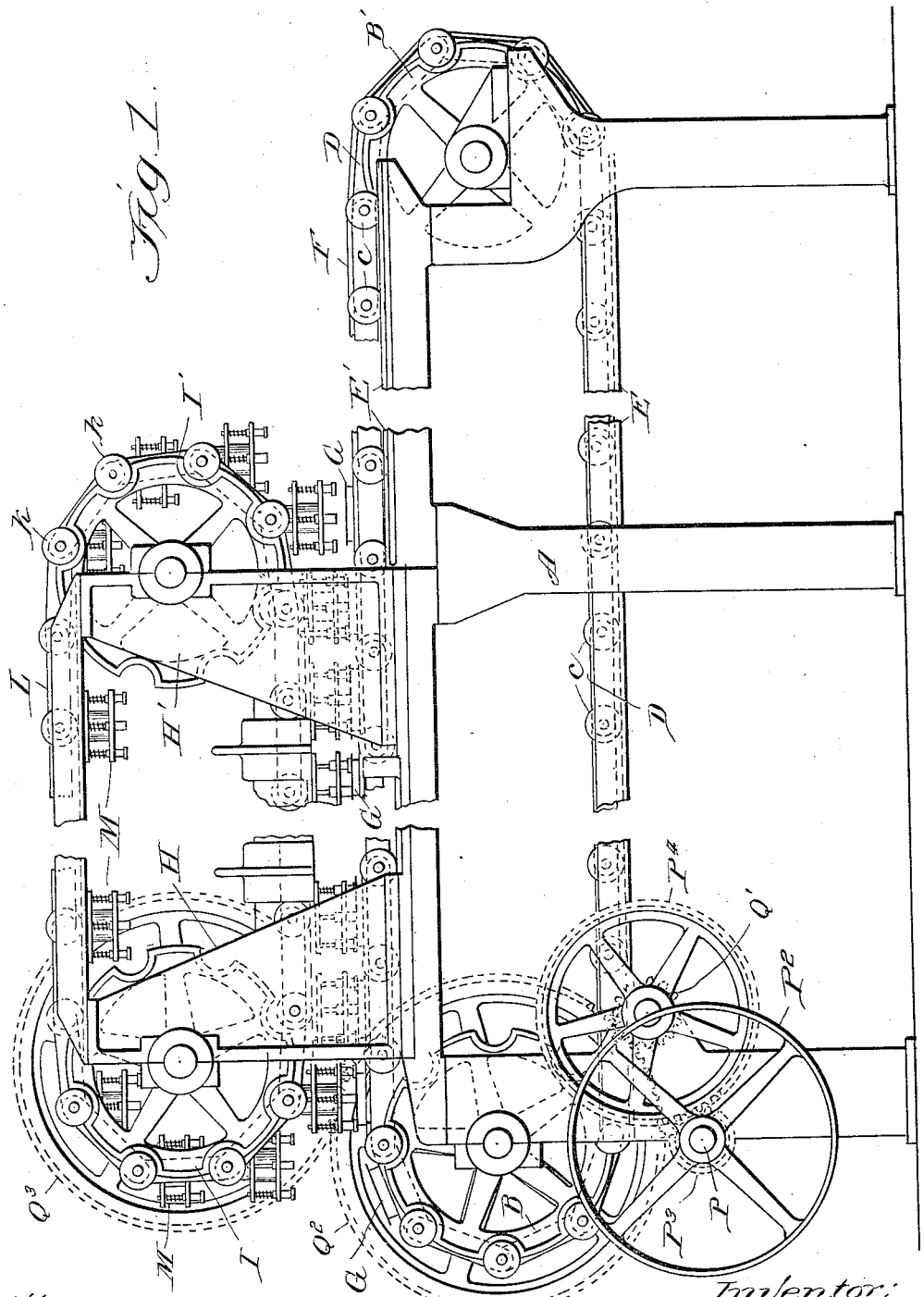

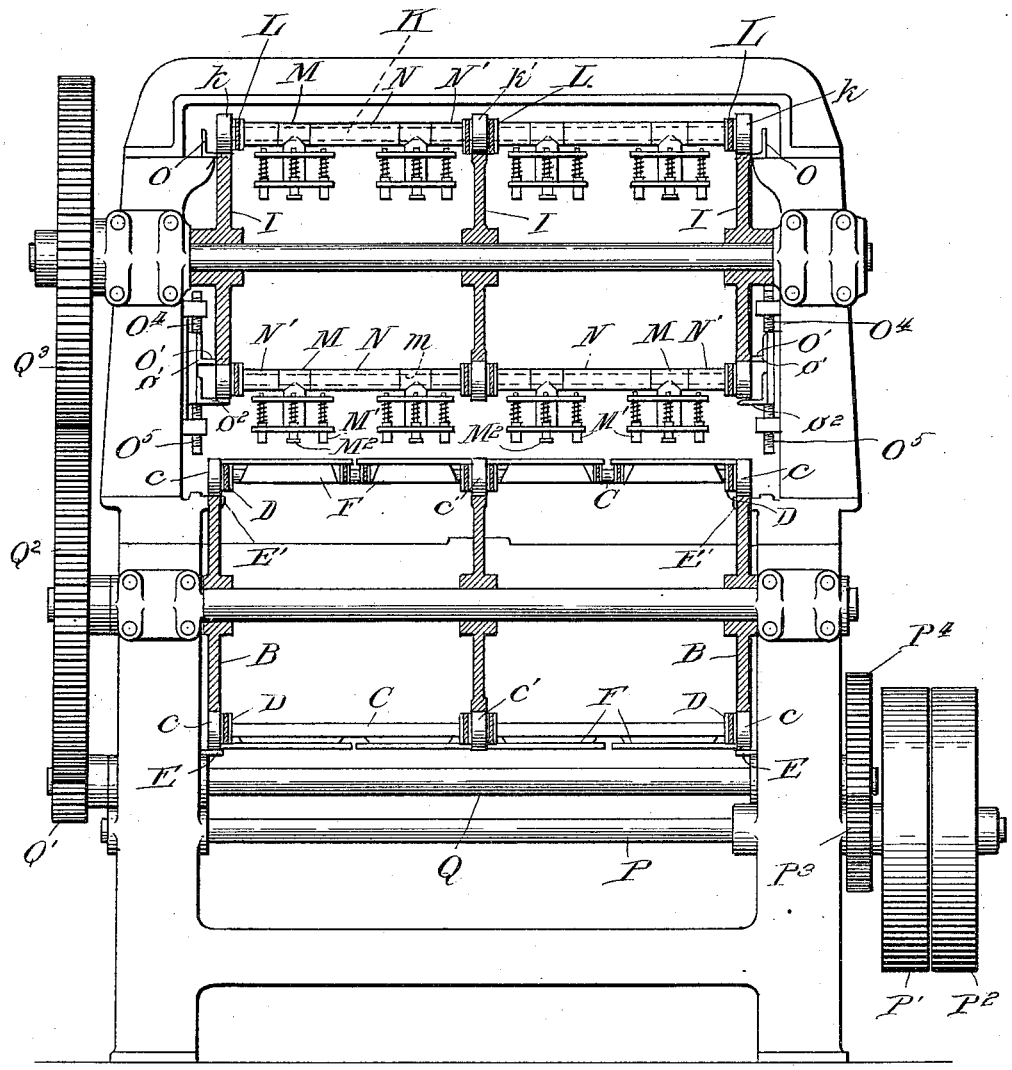

F. P. McCOLL.
CAN SOLDERING MACHINE.
APPLICATION FILED SEPT. 27, 1909.
1,052,736.
Patented Feb. 11, 1913.
3 SHEETS—SHEET 3.
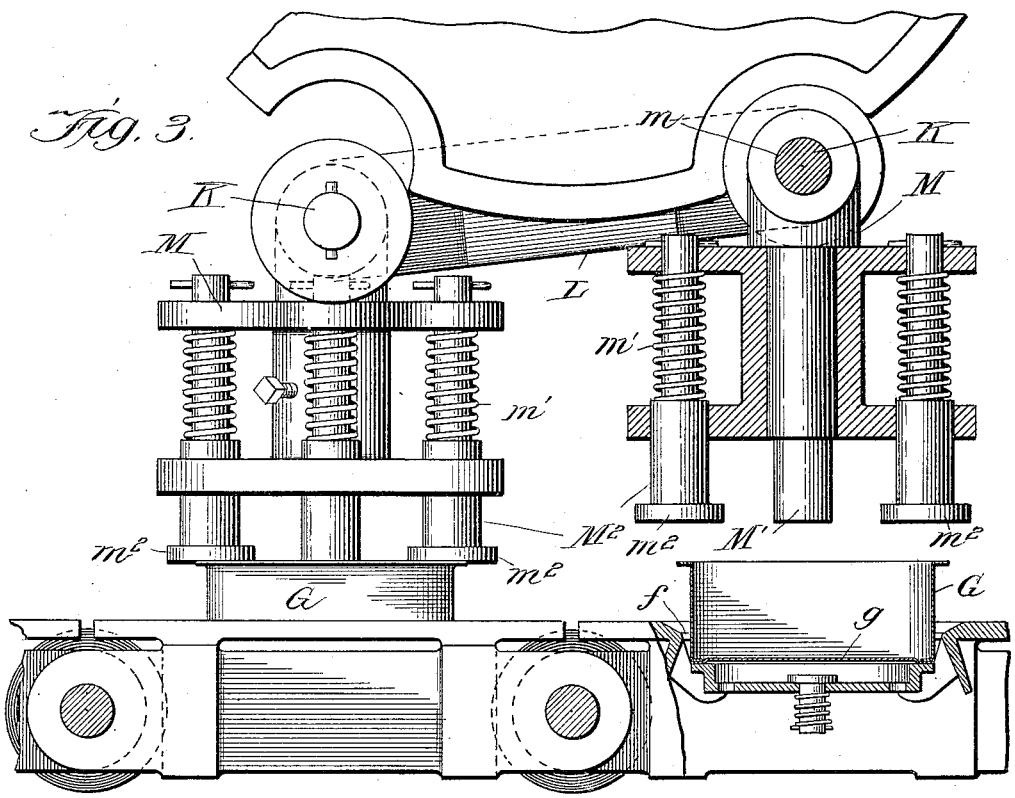
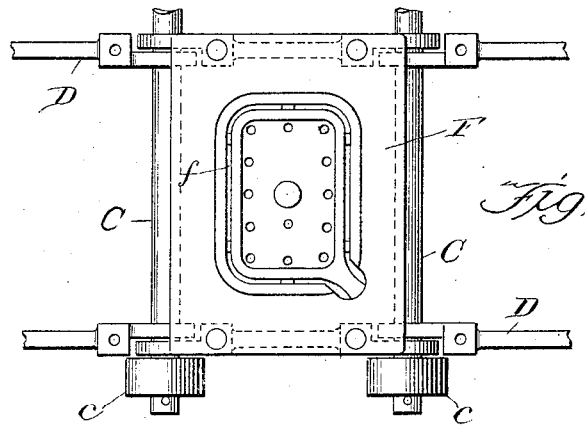
Witnesses:
Harry S. Gaither
Bruce A. Lusk
Inventor:
Francis P. McColl
by Chamberlin & Freudenreich
attys

UNITED STATES PATENT OFFICE.

FRANCIS PATRIDGE McCOLL, OF ST. ANDREWS, NEW BRUNSWICK, CANADA, ASSIGNOR TO AMERICAN KEY CAN COMPANY, A CORPORATION OF NEW JERSEY.

CAN-SOLDERING MACHINE.

1,052,736.      Specification of Letters Patent.      Patented Feb. 11, 1913.

Application filed September 27, 1909. Serial No. 519,820.

*To all whom it may concern:*

Be it known that I, FRANCIS P. McCOLL, a citizen of the United States, residing at St. Andrews, county of Charlotte, New Brunswick, Canada, have invented a certain new and useful Improvement in Can-Soldering Machines, and declare the following to be a full, clear, and exact description of the same, such as will enable others skilled in the art to which it pertains to make and use the same, reference being had to the accompanying drawings, which form a part of this specification.

In my prior Patent No. 717,896, granted January 6, 1903, I have shown and claimed a novel apparatus for holding together the parts of a can during the soldering operation and the subsequent cooling in order to produce a perfect joint. In the arrangement shown in my aforesaid patent the can parts are yieldingly pressed together by parts which are illustrated as being brought together manually into operative relation to the can parts.

The object of the present invention is to produce a machine or apparatus which shall embody the novel features of my aforesaid patent, the pressing together of the can parts being, however, effected automatically.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a machine arranged in accordance with a preferred form of my invention, portions of the machine with points between the ends thereof being omitted in order to show the remaining portions on a large scale; Fig. 2 is a view looking toward the right in Fig. 1, the carriers and drums over which they pass being shown in section; Fig. 3 is a view on an enlarged scale of a fragment of the machine, showing the manner in which the pressure on the can parts is produced, and Fig. 4 is a plan view of one of the can holders and the adjacent supporting parts.

Referring to the drawings, A represents a frame work at the opposite ends of which are journaled drums B and B¹. The length of these drums is dependent on the number of cans which it is desired to arrange side by side in the machine. In the present instance I have shown an arrangement wherein the machine is wide enough to accommodate four cans and in the detailed description I will refer only to this particular form, although it is evident that the width of the machine may be anything desired. Passing around the drums is an endless carrier or conveyer of any suitable type. In the arrangement shown the carrier or conveyer consists of a series of rods C having thereon end wheels or rollers $c$ and a middle wheel or roller $c^1$. These rods are connected by means of links D, the links being arranged in pairs, two for each can. Consequently, in the particular machine shown, each rod is joined to the next adjacent rod by means of eight of these links, the whole forming a broad, flexible carrier or conveyer. The end rollers are adapted to run upon two sets of tracks E—E and E¹—E¹, the purpose of these tracks being to support the conveyer and prevent it from sagging. The middle rollers are preferably run upon tracks which are parallel with the other tracks and support the rods at the middle.

Secured to and supported upon each pair of links is a can holder F preferably, though not necessarily, of the type shown in my application, Serial No. 444,306, filed July 20, 1908. The holder is clearly illustrated and requires no detailed description since the present invention has nothing to do with the particular form of holder. It need only be stated that the holder is so constructed as to permit it to receive a top or bottom can member $g$ and a body member G, there being an annular passage $f$ which permits a flame located beneath the holder to strike against the corner formed by the meeting edges of the can body and the top or bottom part.

Mounted on pedestals H and H¹ above the conveyer previously described are a pair of drums I and I¹, these drums being preferably arranged closer together than the drums B and B¹ so as to permit the can conveyer to project at one end so as to leave a number of the holders exposed and ready to receive the parts which are to be soldered. The drums I and I¹ are the same length as the drums B and B¹ and, passing thereover is a second endless conveyer or carrier which is also made up of a series of rods K similar to the rods C. The rods C—C and K—K are spaced at equal distances apart and the latter are connected together by means of links L—L similar to the links D. In the particular arrangement shown there are only four links between each two consecutive rods, although this arrangement may, of course, be varied. Upon each of the rods K are suspended four frames indicated at M, these frames being spaced apart from each other and from the links by means of sleeves N and N¹, respectively, which surround the rods. The frames are assembled upon the rods by passing the latter through openings $m$ therein, these openings each being sufficiently large to permit the frames to swing by gravity so as always to hang beneath the rods. The frames are so placed upon the rods that each frame lies directly over one of the holders. The rods K are preferably provided with end rollers $k$ and middle rollers $k^1$ which run upon tracks O—O, O¹—O¹, these tracks lying parallel with and corresponding to the tracks E and E¹. Each of the frames is provided with a series of vertically-slidable plungers indicated at M¹ and M². Normally these plungers are held in their lowermost positions by means of springs $m^1$. The plungers M² are preferably provided with enlarged heads $m^2$ on their lower ends for a purpose which will hereinafter appear. The parts are so proportioned and adjusted that when the two conveyers are synchonously driven all of the frames which lie on the under side of the drums I and I¹ will be positioned directly over a portion of the holders which lie above the drums B and B¹ and will so remain until they begin to travel around the drum I. Assuming that the drums B and B¹ are being driven in the counter-clockwise direction and the drums I and I¹ in the clockwise direction and that can parts have been placed in the row of holders which is just about to pass under the drum I¹: the row of frames M which is just about to approach the lowermost point of the drum I¹ is still slightly above the can holders. As the movement of the parts continues the row of frames descends until the plungers M¹ and M² engage with the upper edges of the can bodies and press them yieldingly into the holders, the degree of pressure depending upon the tension of the springs $m^1$ and the relative vertical adjustment of the parts. The soldering operation may now take place, the can parts being held yieldingly together so that tight joints may be secured. After the soldering has been effected the cans may be cooled while still under pressure so that when the holders reach the drum B the cans have been cooled sufficiently to permit them to be discharged without danger of injuring the joints. It will be seen that by pivotally supporting the frames, they are permitted to adjust themselves upon the upper ends of the cans so as to afford a uniform pressure even though there should be slight inaccuracies in the cans. Furthermore, by providing a series of spring-pressed plungers an even distribution of pressure may be obtained around the top of the can bodies. It is not difficult to maintain the alinement between the parts transversely of the machine and, therefore, the plungers M¹ need not be made of large diameter in order to make them seat properly upon the upper edges of the cans. However, there may be some slight play lengthwise of the conveyers and, in order to prevent the frames from coming out of alinement with the holders in the direction of travel, I have provided the plungers M² with enlarged heads $m^2$ as previously described. Even if there should be some slight displacement of the frames relative to the holders in the direction of travel some portion of the head $m^2$ of each of the plungers M² would still engage with the top of the can beneath it.

I prefer to make the tracks O¹ double, that is, having an upper section $o^1$ and a lower section $o^2$. The lower sections of these tracks prevent the upper conveyer from sagging and the upper sections serve to take the upward thrust upon the conveyer when the plungers engage with cans in the holders. The pressure between the frames and the holders may be adjusted in various ways but one of the simplest consists in making the tracks O¹ adjustable in the vertical direction. It will be seen that by means of the screws O⁴ and O⁵ the height of these tracks above the tracks E¹ may be varied within limits to any extent desired. This not only provides for adjustment of pressure but permits the machine to be used upon cans of different heights since it is only necessary to raise or lower the tracks O¹ when the size of the cans is changed.

The conveyers may be driven in any suitable manner. In the arrangement shown I have provided a counter shaft P having belt pulleys P¹ and P², the counter shaft being driven from any suitable source of power. Geared to the shaft P by means of gears P³ and P⁴ is a second shaft Q. The shaft Q is in turn geared to the drums B and I by means of a pinion Q¹ which meshes with a gear wheel Q² on the drum B, the drum I being provided with a gear wheel Q³ of the same size as the wheel Q² and meshing therewith. Consequently the two drums will be driven at the same rate of speed but in opposite directions; this being also true of the conveyers or carriers.

It will now be seen that I have provided a simple and novel machine wherein can parts may be soldered while held together under a uniformly-distributed, yielding pressure and be cooled before the pressure is relieved, without requiring any other manual manipulations except those of placing the can parts in position in the holders; this placing of the can parts being accomplished at the right hand of the machine and a discharging of the completed cans taking place at the other end of the machine.

While I have described with particularity only a single preferred arrangement, I do not desire to be limited to this one arrangement but desire to cover all constructions and arrangements which come within the terms of the definitions of my invention constituting the appended claims.

What I claim is:

1. In a can soldering machine, a movable carrier, a holder on said carrier for receiving parts of a can to be soldered, a second carrier movable parallel and in synchronism with the first carrier, a member yieldingly mounted on said second carrier, and a device yieldingly mounted on said member for movements from and toward said holder, and coöperating with said holder to press the can parts yieldingly into engagement with each other.

2. In a can soldering machine, a movable carrier, a holder on said carrier for receiving parts of a can to be soldered, a second carrier arranged above and parallel to and movable in synchronism with the first carrier, a member yieldingly mounted on said second carrier, and a device yieldingly mounted on said member and coöperating with said holder to press said can parts yieldingly into engagement with each other, said device being mounted so as to have a limited movement on said member from and toward said holder.

3. In a can soldering machine, a movable endless carrier, a series of holders on said carrier for receiving parts of a can to be soldered, a second endless carrier having a portion lying parallel with a portion of the first carrier, a series of members yieldingly mounted on said second carrier and spaced as far apart as the holders on the other carrier, a device yieldingly mounted on each of said members in a position to coöperate with one of said holders to press said can parts yieldingly together, each of said devices being mounted so as to have a limited movement from and toward said holder, and means for driving said carriers so as to cause the same parallel portions thereof to travel at the same rate of speed.

4. In a can soldering machine, a movable carrier, a holder on said carrier for receiving parts of a can to be soldered, a second carrier, a member pivotally mounted on said second carrier, a device yieldingly mounted on said member in a position to coöperate with said holder and press said can parts together, said device being mounted on said member so as to have a limited movement from and toward said holder, and means for actuating said carriers.

5. In a can soldering machine, an endless flexible carrier, holders on said carrier for receiving parts of a can to be soldered, a set of tracks for supporting a portion of said carrier, a second flexible carrier, a set of tracks for supporting a portion of the latter carrier parallel with the aforesaid portion of the first carrier, and members yieldingly mounted on said second carrier in such a manner as to permit them to have limited movements in directions transverse to each other and in positions to coöperate with said holders to press said can parts together along said parallel portions of the carrier.

6. In a can soldering machine, a movable carrier, a holder on said carrier for receiving parts of a can to be soldered, a second carrier, a member pivotally mounted on said second carrier, a spring-pressed device carried by said member in position to coöperate with said holder to press said can parts together, and means for actuating said carriers.

7. In a can soldering machine, an endless carrier, a series of holders on said carrier for receiving parts of a can to be soldered, a second endless carrier having a portion lying parallel with a portion of the first carrier, a series of members pivotally mounted on said second carrier in such positions that each of the said members lies opposite one of the holders along those portions of the carriers which lie parallel to each other, and spring-pressed devices on said members for coöperating with said holders to press said can parts together.

8. In a can soldering machine, an endless carrier, a series of holders on said carrier for receiving parts of a can to be soldered, a second endless carrier having a portion lying parallel with a portion of the first carrier, a series of frames pivotally hinged on said second carrier at distances apart equal to the distance between consecutive holders, and spring-pressed members on said frames for coöperating with said holders to press said can parts together throughout those portions of the carriers which are parallel with each other.

9. In a can soldering machine, an endless carrier, a series of holders on said carrier for receiving parts of a can to be soldered, a second endless carrier having a portion lying parallel with a portion of the first carrier, a series of frames pivotally hinged on said second carrier at distances apart equal to the distance between consecutive holders, and a plurality of spring-pressed plungers on each of said frames for coöperating with said holders to press said can parts together throughout those portions of the carriers which are parallel with each other.

10. In a can soldering machine, an endless carrier, holders on said carrier for receiving parts of a can to be soldered, a set of tracks for supporting a portion of said carrier, a second carrier, a set of tracks for supporting a portion of said second carrier parallel with the aforesaid portion of the first carrier, and spring-pressed members on said second carrier arranged to coöperate with said holders to press said can parts together along said parallel portions of the carriers.

In testimony whereof, I sign this specification in the presence of two witnesses.

FRANCIS PATRIDGE McCOLL.

Witnesses:
    FLORENCE E. SMALL,
    JESSIE M. PEABODY.

Copies of this patent may be obtained for five cents each, by addressing the "Commissioner of Patents, Washington, D. C."